US008697023B2

(12) United States Patent
Schroll

(10) Patent No.: US 8,697,023 B2
(45) Date of Patent: Apr. 15, 2014

(54) METHOD FOR PRODUCING HIGH-PURITY SILICON NITRIDE

(75) Inventor: Georg Schroll, Nuβdorf (DE)

(73) Assignee: Alzchem Trostberg GmbH, Trostberg (DE)

( * ) Notice: Subject to any disclaimer, the term of this patent is extended or adjusted under 35 U.S.C. 154(b) by 288 days.

(21) Appl. No.: 13/139,354

(22) PCT Filed: Dec. 10, 2009

(86) PCT No.: PCT/EP2009/066828
§ 371 (c)(1),
(2), (4) Date: Aug. 16, 2011

(87) PCT Pub. No.: WO2010/066839
PCT Pub. Date: Jun. 17, 2010

(65) Prior Publication Data

US 2012/0141349 A1 Jun. 7, 2012

(30) Foreign Application Priority Data

Dec. 13, 2008 (DE) ........................ 10 2008 062 177

(51) Int. Cl.
*C01B 21/068* (2006.01)

(52) U.S. Cl.
USPC .......................................... 423/344; 423/324

(58) Field of Classification Search
USPC ......................................... 423/344, 324, 351
See application file for complete search history.

(56) References Cited

U.S. PATENT DOCUMENTS

| | | | |
|---|---|---|---|
| 4,122,155 | A | 10/1978 | Prochazka et al. |
| 4,405,589 | A | 9/1983 | Iwai et al. |
| 4,952,715 | A | 8/1990 | Blum et al. |
| 5,008,422 | A | 4/1991 | Blum et al. |
| 5,114,693 | A | 5/1992 | Hintermayer et al. |
| 5,232,677 | A | 8/1993 | Fukuoka et al. |
| 5,378,666 | A | 1/1995 | Bachelard et al. |
| 5,662,875 | A | 9/1997 | Bachelard et al. |
| 5,998,319 | A | 12/1999 | Hintermayer |

FOREIGN PATENT DOCUMENTS

| | | |
|---|---|---|
| DE | 3937413 | 6/1990 |
| DE | 4003457 | 3/1991 |
| EP | 0365295 | 4/1990 |
| EP | 0377132 | 7/1990 |
| EP | 0440235 | 8/1991 |
| EP | 0479050 | 4/1992 |
| JP | 60122706 | 7/1985 |
| JP | S61266305 | 11/1986 |
| JP | 6109710 | 4/1994 |
| JP | 06219715 | 8/1994 |
| JP | 06345412 | 12/1994 |
| JP | 09255309 | 9/1997 |
| JP | H09255311 | 9/1997 |
| JP | H10095604 | 4/1998 |
| JP | H10203818 | 8/1998 |
| WO | WO-9417011 | 8/1994 |

OTHER PUBLICATIONS

"German Search Report", Application No. 10 2008 062 177.3, Dec. 13, 2008.
"PCT Search Report", Application No. PCT/EP2009/066828, Jul. 14, 2011.
Jovanovic, Z. R. , "Kinetics of direct nitridation of pelletized silicon grains in a fluidized bed: experiment, mechanism and modelling", Journal of Materials Sciences, 1998, 33: 2339-2355.
Mangels, John A., "Effect of Rate-Controlled Nitriding and Nitriding Atmospheres on the Formation of Reaction-Bonded $Si_3N_4$", Ceramic Bulletin, 1981, vol. 60;No. 6; 613-617.
Moulson, A. J. , "Review Reaction-bonded silicon nitride: its formation and properties", Journal of Materials Science, 1979, 14: 1017-1051.

*Primary Examiner* — Edward Johnson
(74) *Attorney, Agent, or Firm* — Kilpatrick Townsend & Stockton LLP

(57) ABSTRACT

A method for producing high-purity silicon nitride in two steps is described, wherein a) high-purity silicon is reacted with nitrogen in a rotary tubular furnace comprising a first temperature zone of 1,150 to 1,250° C. and at least one other temperature zone of 1,250 to 1,350° C. in the presence of a gas mixture comprising argon and hydrogen, said reaction proceeding up to a nitrogen content of 10 to 30 wt % and b) allowing the partially nitrogen-containing product from step a) to react in a chamber or settling furnace in a quiescent bed at 1,100 to 1,450° C. with a mixture of nitrogen, argon and optionally hydrogen up to the completion of nitrogen uptake. It is possible, utilizing the method according to the invention, to produce high-purity silicon nitride with a purity of >99.9 in a technically simple manner, wherein no further purification steps, such as leaching with inorganic acids, are required.

21 Claims, No Drawings

METHOD FOR PRODUCING HIGH-PURITY SILICON NITRIDE

PRIOR RELATED APPLICATIONS

This application is a National Phase application of PCT/EP2009/066828 filed Dec. 10, 2009 which claims priority to DE 102008062177.3 filed Dec. 13, 2008, both of which are incorporated by reference herein in their entirety.

The present invention provides a two-stage method for producing high purity silicon nitride by azotising metallic silicon powder.

Silicon nitride powder is an industrially important starting material for the production of ceramic materials having elevated temperature and corrosion resistance combined with strength. This material is used in particular for producing parts which are exposed to severe thermal stresses. Silicon nitride is accordingly used in particular in engine and turbine construction or for producing chemical apparatus. In the metallurgical industry, silicon nitride is an important component of runners, ladles, tapping spouts and crucibles etc.

The properties of the articles shaped from silicon nitride are largely determined by its purity.

Numerous methods for producing high purity silicon nitride have already been developed in the prior art, and may be subdivided into four method variants.

A particularly large number of methods involve the thermal decomposition of silicon tetrachloride or chlorosilanes in the presence of ammonia or hydrogen/nitrogen mixtures.

For example, according to the EP 365 295 A1, crystalline silicon nitride powder is accordingly produced by a gas phase reaction of ammonia with a silane at temperatures of 900 to 1450° C.

U.S. Pat. No. 4,122,155 discloses a method for producing amorphous silicon nitride powder, wherein silanes and ammonia are reacted in a temperature range from 600 to 1000° C. and then the amorphous reaction product is calcined at at least 1100° C., in order in this manner to produce ultra-fine silicon nitride powder with elevated purity.

According to Japanese published patent application JP 06-345412, a highly pure silicon nitride/silicon carbide complex is produced by thermally decomposing organosilicon compounds, such as for example hexamethyldisilazane. The corresponding reaction product is used for producing superconductors.

U.S. Pat. Nos. 4,952,715 and 5,008,422 describe the thermal decomposition of polysilazanes, wherein mixtures of silicon nitride, silicon carbide and optionally silicon oxynitride are obtained.

A drawback of all these method variants is the fact that ammonia must be used, which is extremely technically difficult and is associated with particular safety measures. The other alternative, namely producing silicon nitride starting from organosilicon compounds, such as for example silazanes, must be considered highly technically complex and largely uneconomic for the large scale industrial production of silicon nitride.

The situation is similar with the second method variant, namely the precipitation and thermal decomposition of silicon diimide.

European Patent 479 050, for example, accordingly describes a silicon diimide with a carbon content of at most 0.5 wt. % and a chlorine content of at most 20 ppm, which is converted into silicon nitride in a nitrogen-containing atmosphere.

It must here be considered particularly disadvantageous that the silicon diimide must be produced by reacting silicon tetrachloride or silicon sulfide with liquid or gaseous ammonia, something which can only be achieved on an industrial scale with elaborate plant and equipment.

The method according to U.S. Pat. No. 4,405,589 has the same disadvantages, said patent disclosing a method for producing silicon nitride powder, wherein a chloroalkylsilane is firstly reacted with ammonia in the liquid or gas phase and the resultant silicon diimide is then calcined in an inert gas atmosphere in a temperature range from 1200 to 1700° C.

The third method variant involves the carbothermal reduction of materials containing silicon dioxide in the presence of nitrogen.

Japanese published patent application JP 60-122706, for example, accordingly discloses the production of silicon nitride powder, wherein a mixture of silicon dioxide is calcined with carbon and silicon nitride in an inert gas atmosphere consisting of nitrogen.

U.S. Pat. No. 5,378,666 discloses the production of whisker-free silicon nitride particles which are obtained by reacting $SiO_2$ and carbon in a porous carbon-containing matrix.

U.S. Pat. No. 5,662,875 moreover describes a continuous method for producing finely divided silicon nitride, wherein silicon dioxide and carbon are reacted in a nitrogen-containing atmosphere in the presence of seed crystals.

The disadvantages of this method variant are substantially that relatively pure starting materials must be used and that the reaction conditions must be accurately controlled in order to avoid the formation of the unwanted secondary product silicon carbide. Moreover, the corresponding final products contain appreciable quantities of carbon and oxygen.

The fourth method variant for producing silicon nitride is the azotisation of silicon powder, which is above all suitable for the large scale industrial production of silicon nitride powder.

Japanese patent application JP 06-219715 describes the production of high purity silicon nitride powder with an elevated α-phase content, wherein metallic silicon powder is reacted with nitrogen in the presence of calcium oxide. A drawback of this method variant is the fact that the corresponding silicon nitride powder has a relatively high calcium content and removing the calcium entails additional technical effort.

EP 377 132 B1, for example, discloses the direct production of silicon nitride by reacting silicon and nitrogen without further additives. In this case, in the first reaction stage silicon powder is reacted with nitrogen at 1000 to 1800° C. up to a nitrogen content of 5 to 25 wt. % and in a second reaction stage the partially azotised product is finally azotised in a mixture of nitrogen and inert gas at 1100 to 1600° C. Using this method, it is only possible to achieve a degree of purity of at most 99.8%.

The object of the present invention was accordingly to develop a method for producing high purity silicon nitride which does not comprise the stated disadvantages of the prior art, but instead enables the production of high purity silicon nitride in a technically simple and inexpensive manner.

This object has been achieved according to the invention in that a) high purity silicon is reacted with nitrogen in a cylindrical rotary kiln having a first temperature zone of 1150 to 1250° C. and at least one further temperature zone of 1250 to 1350° C. in the presence of a gas mixture consisting of argon and hydrogen, up to a nitrogen content of 10 to 30 wt. % and b) the partially azotised product from stage a) is reacted in a stationary bed in a chamber or batch kiln at 1100 to 1450° C. with a mixture of nitrogen and optionally argon and/or optionally hydrogen, preferably with a mixture of nitrogen and argon and optionally hydrogen, until nitrogen absorption ceases.

It has surprisingly been found that, with the assistance of the method according to the invention, high purity silicon nitride with a purity of >99.9% may be produced in a technically simple manner.

In the method according to the present invention, silicon is azotised in two stages. In the first reaction stage a), high purity silicon is reacted with nitrogen in a cylindrical rotary kiln up to a nitrogen content of 10 to 30 wt. %, preferably of 15 to 20 wt. %.

The high purity silicon should here have a purity of preferably >99.9%, in particular of >99.99%. The metallic impurities in the silicon should here in particular amount to <100 ppm and preferably <50 ppm.

The particle size of the silicon powder used may be varied within broad limits, but it has proved particularly advantageous to use silicon powder with a grain size of <100 μm, preferably of 1 μm to 50 μm and in particular of <20 μm.

It is to be regarded as essential to the invention for the partial azotisation in stage a) to be carried out in a cylindrical rotary kiln which comprises a first temperature zone of 1150 to 1250° C. and at least one further temperature zone of 1250 to 1350° C., wherein the further temperature zones should preferably each exhibit higher temperatures than the preceding temperature zone. Each successive further temperature zone preferably has a temperature which is at least 5° C. higher, in particular at least 10° C. higher than the respective preceding temperature zone. According to a preferred embodiment, the cylindrical rotary kiln has a first temperature zone of 1150 to 1250° C. and two further temperature zones of 1250 to 1350° C.

This method variant ensures that the heat of reaction arising from the exothermic reaction is immediately released to the rotary cylinder, so largely avoiding any overheating of the reaction product.

The partial azotisation in stage a) is carried out in the presence of a gas mixture consisting of argon and hydrogen, wherein the argon content amounts in particular to 5 to 30 vol. % and particularly preferably 10 to 20 vol. %, relative to the nitrogen content.

The proportion of hydrogen in stage a) is preferably set at 1 to 10 vol. % and particularly preferably to 3 to 7 vol. %, relative to the sum of nitrogen and argon.

In a preferred embodiment, apart from the starting materials silicon and nitrogen and the gas mixture consisting of argon and hydrogen, no further substances are present in the reaction in step a). In a further preferred embodiment, the reaction according to step a) proceeds in any event in the absence of calcium oxide.

With regard to pressure, the reaction conditions in reaction stage a) are relatively non-critical, but it has proved particularly advantageous to perform the partial azotisation in the cylindrical rotary kiln in the pressure range from 1.01 to 1.8 bar, in particular from 1.1 to 1.7 bar. This application of a slightly elevated pressure in particular avoids sealing problems in the cylindrical rotary kiln.

The residence time of the silicon powder in reaction stage a) may vary very widely as a function of the size of the cylindrical rotary kiln and the throughput rate of the silicon. In general, the residence time of the silicon powder in reaction stage a) amounts to 60 to 180 minutes, preferably to 90 to 180 minutes. The residence time in each of the first and further temperature zones here preferably amounts to at least 5 minutes and in particular to at least 10 minutes and most preferably to at least 20 minutes.

In the second reaction stage b), the partially azotised product from stage a) is reacted in a stationary bed in a chamber or batch kiln at 1100 to 1450° C. in the presence of a gas mixture consisting of nitrogen, argon and optionally hydrogen.

In a preferred embodiment, apart from the starting materials partially azotised product from stage a) and nitrogen together with the gas mixture consisting of nitrogen, optionally argon and/or optionally hydrogen, no further substances are present in step b).

Azotisation is here continued until the nitrogen consumption per unit time has dropped virtually to zero, such that the product has entirely reacted to completion and has achieved a nitrogen content of up to 39.5%. According to a preferred embodiment, the proportion of nitrogen in the reaction gas in stage b) is initially set at 20 to 80 vol. % and, as the reaction progresses, increased to up to 100 vol. % nitrogen.

A mixture consisting of nitrogen, argon and optionally hydrogen is thus preferably initially used and then replaced by up to 100 vol. % of nitrogen over the course of the reaction.

The proportion of hydrogen in stage b) may preferably amount to up to 10 vol. %, in particular to 1 vol. % to 8 vol. %, relative to the sum of nitrogen and argon.

The residence time of the partially azotised silicon nitride in the chamber or batch kiln is in turn substantially dependent on the dimensions of the kiln and the throughput rate of the silicon nitride and on average amounts to 1 to 14 days.

The method is here preferably controlled such that the reaction is started in stage b) at a temperature in the range from 1100° C. to 1250° C. During the reaction in stage b), the temperature is then preferably raised, in particular to 1300° C. to 1450° C. The temperature is preferably increased incrementally.

The silicon nitride obtained in stage b) generally takes the form of porous, substantially spherical granules with a particle size of 0.1 to 30 mm, preferably of 0.5 to 25 mm. If desired, depending on how it is to be further processed, the spherical granules may be ground to yield a finely divided silicon nitride powder.

The silicon nitride produced by the method according to the invention here preferably has an α-phase of >60 wt. %.

With the assistance of the method according to the invention, it is thus possible to produce high purity silicon nitride with a purity of >99.9%, in particular of >99.99%, in a technically simple manner, with no further purification steps, such as for example leaching with inorganic acids, being necessary.

The following Examples are intended to explain the invention in greater detail.

EXAMPLES

Example 1

Silicon powder of a grain size of <20 μm and a purity of >99.99% Si, the sum of the metallic impurities contained therein amounting to <40 ppm, was continuously charged into a rotary cylinder through which a stream of nitrogen (99.99%), argon (>99.99%), and hydrogen (>99.99%) was being passed. A hydrogen content of 3.5 vol. % was here set in the gas mixture relative to the sum of nitrogen and argon. The proportion of argon relative to nitrogen was 12 vol. %. The heating zones of the rotary kiln were heated to 1250, 1330 and 1350° C. The rotational speed of the cylinder was 1.2 rpm and at a gas mixture partial pressure of $1.01\times10^5$ (1.01 bar) and a residence time in the reaction zones of 120 min, the exothermic reaction gave rise to a partially azotised product. The porous, substantially spherical granules, which were obtained in a grain size range of 1 to 25 mm, had a nitrogen content of on average 19.4 wt. %. After transferring these granules into a gas-tight chamber kiln with a nitrogen/argon/hydrogen atmosphere in a 34:60:6 vol. % ratio, wherein the nitrogen/argon/hydrogen ratio is controlled in accordance with the ongoing course of the reaction (higher proportion of argon in the gas mixture if the reaction progresses rapidly than if it progresses slowly), the product was reacted to completion in 10 days at a temperature starting from 1150° C. by incrementally increasing the kiln temperature to 1410° C. The proportion of nitrogen in the reaction gas was increased in accordance with the progress of the reaction up to 100% nitrogen. The proportion of nitrogen in the resultant silicon nitride was 39.2%, the product being obtained as loose, porous granules corresponding to the unchanged grain size range of the introduced partially azotised granules. The resultant silicon nitride was ground to a grain size of <10 μm in an appropriately adjusted jet mill.

Phase analysis of the resultant product revealed an α-phase content of 85% in the silicon nitride, the remainder being present in the β modification.

Example 2

Silicon powder of a grain size of <20 μm and a purity of >99.99% Si, the sum of the metallic impurities contained therein amounting to <40 ppm, was continuously charged into a rotary cylinder through which a stream of nitrogen (99.99%), argon (>99.99%), and hydrogen (>99.99%) was being passed. A hydrogen content of 3.5 vol. % was here set in the gas mixture relative to the sum of nitrogen and argon. The proportion of argon relative to nitrogen was 19 vol. %. The heating zones were heated to 1150, 1250 and 1260° C. The rotational speed of the tube was 1.1 rpm, the gas mixture partial pressure was $1.01\times10^5$ (1.01 bar). The residence time of the powder in the rotary cylinder was 180 minutes. Porous spherical granules ranging in diameter from 0.5 to 15 mm and with an average nitrogen content of 17.8 wt. % were obtained. The resultant partially azotised granules were further azotised with a nitrogen/argon/hydrogen atmosphere in a loose bed in a gas-tight chamber kiln heated to 1200° C., the nitrogen/argon/hydrogen atmosphere being set to a 54:40:6 vol. % ratio. The temperature of the kiln was raised incrementally over 7 days to 1405° C. until nitrogen absorption ceased completely. The ratio of nitrogen to argon was increased in accordance with the progress of the reaction to 100% nitrogen. A silicon nitride containing on average 38.8% N was obtained from the kiln as loose, porous granules corresponding to the unchanged grain size range of the introduced partially azotised granules. The silicon nitride granules were then ground to <10 μm in a jet mill. Phase analysis revealed an α-phase content of 65%.

Average analysis of the ground products revealed the following impurities.

| Element | Concentration ppm |
|---|---|
| Al | 2 |
| B | <2 |
| Ca | 2 |
| Co | <1 |
| Cr | <2 |
| Cu | <1 |
| Fe | 6 |
| K | <1 |

-continued

| Element | Concentration ppm |
|---|---|
| Li | <1 |
| Mg | <1 |
| Mn | <2 |
| Mo | <1 |
| Na | <2 |
| Ni | <2 |
| Ti | <3 |
| V | <1 |
| W | <1 |

The invention claimed is:

1. A method for producing high purity silicon nitride comprising the steps of:

a) reacting a high purity silicon powder with nitrogen in a cylindrical rotary kiln having a first temperature zone of 1150 to 1250° C. and at least one further temperature zone of 1250 to 1350° C. in the presence of a gas mixture consisting of argon and hydrogen, up to a nitrogen content of 10 to 30 wt. % to form a partially azotised silicon; and, b) reacting the partially azotised silicon from step a in a chamber or batch kiln in a stationary bed at 1100 to 1450° C. with a mixture of nitrogen and optionally argon and/or optionally hydrogen until nitrogen absorption ceases to form high purity silicon nitride.

2. The method of claim 1, wherein the high purity silicon powder has a grain size of <100 μm.

3. The method of claim 1, wherein the high purity silicon powder has a purity of >99.9%.

4. The method of claim 1, wherein metallic impurities in the high purity silicon powder amount to <100 ppm.

5. The method of claim 1, wherein the cylindrical rotary kiln in step a has an additional further temperature zone of 1250 to 1350° C.

6. The method of claim 1, wherein the argon content in step a is 5 to 30 vol. %, relative to the nitrogen content.

7. The method of claim 1, wherein the hydrogen in step a is in a quantity of 1 to 10 vol. %, relative to the sum of nitrogen and argon.

8. The method of claim 1, wherein step a is carried out in the cylindrical rotary kiln in a pressure range of 1.01 to 1.8 bar.

9. The method of claim 1, wherein the residence time of the high purity silicon powder in step a is 60 to 180 minutes.

10. The method of claim 1, wherein the nitrogen content in step a is 15 to 20 wt. %.

11. The method of claim 1, wherein in step b, the proportion of nitrogen in the reaction gas is set to 20 to 80 vol. % and is increased to 100 vol. % as the reaction progresses.

12. The method of claim 1, wherein in step b, the proportion of hydrogen is 0 to 10 vol. %, relative to the sum of nitrogen and argon.

13. The method of claim 1, wherein the partially azotised silicon nitride in step b reacts for 1 to 14 days.

14. The method of claim 1, wherein the high purity silicon nitride produced in step b has an α-phase of >60 wt. %.

15. The method of claim 1, wherein the high purity silicon nitride produced in step b is granular and has a particle size of 0.1 to 30 mm.

16. The method of claim 1, wherein the high purity silicon powder has a grain size of <20 μm.

17. The method of claim 1, wherein the high purity silicon powder has a purity of >99.99%.

18. The method of claim 1, wherein metallic impurities in the high purity silicon powder amount to <50 ppm.

19. The method of claim 1, wherein the argon content in step a is 10 to 20 vol. %, relative to the nitrogen content.

20. The method of claim 1, wherein the hydrogen in step a is in a quantity of 3 to 7 vol. % relative to the sum of nitrogen and argon.

21. The method of claim 1, wherein the high purity silicon nitride produced in step b is granular and has a particle size of 0.5 to 25 mm.

* * * * *